United States Patent [19]

McCully

[11] Patent Number: 5,016,900

[45] Date of Patent: May 21, 1991

[54] DEVICE FOR ACCOMPLISHING DIRECTIONAL MOVEMENT OF A TRAILER

[76] Inventor: Clyde E. McCully, P.O. Box 3565, Paradis, La. 70080

[21] Appl. No.: 453,674

[22] Filed: Dec. 20, 1989

[51] Int. Cl.$^5$ .......................... B60D 1/36; B62D 51/04
[52] U.S. Cl. .................................. 280/477; 280/767; 180/19.2
[58] Field of Search ...................... 280/475, 477, 763.1, 280/414.1, 414.2, 767, 766.1, 43.21; 180/19.2, 13, 15, 214, 19.3

[56] References Cited

U.S. PATENT DOCUMENTS

| | | | |
|---|---|---|---|
| 2,630,186 | 3/1953 | Joy | 180/214 |
| 3,156,315 | 11/1964 | Hawgood | 180/13 |
| 3,273,733 | 9/1966 | Schuler | 280/475 X |
| 3,861,482 | 1/1975 | Stephens et al. | 180/13 |
| 3,921,958 | 11/1975 | Brockelsby et al. | 280/475 X |
| 4,860,841 | 8/1989 | Sacco | 180/13 |

FOREIGN PATENT DOCUMENTS 2046190 11/1980 United Kingdom ................ 280/767

Primary Examiner—Charles A. Marmor
Assistant Examiner—Kevin Harley
Attorney, Agent, or Firm—Notaro & Michalos

[57] ABSTRACT

An outer hollow tube has a rack which can engage a pinion in a crank housing which is clamped to the tongue of a trailer for raising and lowering the hollow tube. An inner hollow shaft is mounted for rotation within the outer tube and carries a steering handle at its upper end. A bracket is mounted to the lower end of the inner hollow shaft and a wheel is mounted for rotation about a horizontal axis to the bracket. An inner shaft extends through the hollow shaft and is connected to a gear train at its lower end for transmitting rotatiion of the inner shaft to rotation of the wheel in the bracket. A crank handle is connected to the upper end of the inner shaft. By manipulating the steering bar and crank handle, the wheel can be steered and driven to move the trailer tongue into a desired position with a socket of the tongue over a ball of a trailer hitch. In this position, the pinion is manually rotated by a second crank handle for raising the tube with respect to the tongue and thereby lowering the tongue.

11 Claims, 2 Drawing Sheets

DEVICE FOR ACCOMPLISHING DIRECTIONAL MOVEMENT OF A TRAILER

FIELD AND BACKGROUND OF THE INVENTION

The present invention relates in general to trailers, such as boat trailers, camper trailers and mobile homes, and in particular to a new and useful device which can be manually manipulated for directionally moving the tongue of a trailer to help align the socket which is typically provided on the trailer tongue, with the ball of a conventional trailer hitch, which is attached to the towing vehicle.

For very light items that are to be transported by a trailer, such as a very small aluminum skiff, it is a fairly simple matter to connect the trailer to the trailer hitch. In such a case, a person physically pulls and positions the trailer so that the socket of the trailer tongue is directly above the ball of the trailer hitch, so that the socket can be lowered onto the ball.

For a very heavy trailer load, however, the foregoing procedure cannot be followed because the trailer is simply too heavy for a person to physically maneuver the socket into position over the ball of the trailer hitch. Hence, the most often used method of connecting to a heavily laden trailer is by backing up the towing vehicle until the towing hitch is directly under the socket of the trailer tongue. The problem with such a procedure is that the driver of the towing vehicle is operating "blindly", i.e. he cannot see the trailer hitch or tongue. Hence, it usually takes multiple attempts by the driver to position the vehicle properly. In such a procedure, the driver will often ram the vehicle into the trailer tongue, causing damage to the vehicle and/or trailer.

Once the vehicle is in proper position, the heavily laden trailer is lowered so that the socket of the trailer tongue engages the ball of the trailer hitch. This lowering procedure is typically accomplished by way of a cranking assembly composed of a vertical post which is clamped into position on the forward portion of the trailer tongue. The vertical post is provided with a gear rack which cooperates with a crank handle for movement of the clamp and attached trailer tongue with respect to the vertical post. Vertically adjustable posts are also known which carry vertically adjustable caster wheels at their lower end.

U.S. Pat. No. 4,687,219 to Rendzio and U.S. Pat. No. 4,094,527 to Miller both illustrate this type of vertically adjustable caster wheel. Characteristically, the wheels are mounted for pivotal movement about a vertical axis in the direction to follow the movements of the trailer tongue. The wheels are also mounted for free rotation about horizontal axes. Miller is interesting for its use of an additional retractable wheel which is mounted on a leg which precludes any steering movement of the wheel. This additional wheel is used for insuring a straight linear movement of the trailer when launching and retrieving the boat.

U.S. Pat. No. 4,266,796 to Riggs et al. also utilizes a wheel at the tongue of a trailer which can be raised and lowered for use in moving the trailer when it is not hitched to a vehicle. In addition to having a crank for raising and lowering the wheel, Riggs. et al. includes crank handles which can be used to steer and brake the rotation of the wheel to help manipulate a boat trailer into the water when a towing vehicle cannot be brought to the edge of the water. Riggs et al. does not, however, include means for driving the wheel, either manually or otherwise, for moving the trailer through rotation of the wheel.

U.S. Pat. No. 4,300,252 to Montooth discloses a trailer tongue arrangement with wheel which is meant for direct attachment to the bow of a boat. Additional wheels are provided at the stern of the boat. The wheel at the bow can be raised and lowered and its rotation can also be braked to control launching of the boat.

U.S. Pat. No. 2,504,403 to Finley and U.S. Pat. No. 2,908,266 to Cooper are cited for their disclosure of load carrying three-wheeled vehicles having two load carrying wheels at one end of the vehicles and a single power driven and steerable wheel at the opposite end of the vehicle.

SUMMARY OF THE INVENTION

The present invention comprises a steering and driving device to be attached to the tongue of a trailer, in particular a boat, camper or mobile home trailer. The device is attached to the tongue behind the trailer hitch, and includes a single lower wheel which can be raised and lowered, to respectively lower and raise the tongue of the trailer. The device provides means for manually steering and manually driving the wheel so that the trailer can be moved short distances for aligning the hitch to the towing ball of a vehicle. The invention is particularly useful for heavy trailer loads where it would be difficult to move the tongue directly without some additional help.

In operation, the towing vehicle is positioned so that the trailer hitch on the vehicle is approximately in the location of the socket on the trailer tongue. A primary advantage of the present invention is that an exact positioning between the towing vehicle and the trailer is not necessary. Hence the driver will typically be able to back the towing vehicle into proper position in only one or two attempts so that the ball of the trailer hitch is within a few feet of the socket.

The operator then utilizes a steering bar and a hand crank, provided on the device of the present invention, for manually steering and manually driving the wheel to bring the socket of the trailer tongue over the ball of the trailer hitch. Thereafter, another manually rotated crank is operated to raise the wheel at the trailer tongue and thereby lower the socket onto the ball.

Accordingly, an object of the present invention is to provide a device for directionally moving a trailer having a tongue for towing the trailer, the device comprises: an elongated support member having a longitudinal axis; securing means operatively connected to the support member and connectable to the trailer tongue for supporting the support member on the trailer tongue; a wheel mount; a wheel mounted for rotation about a rotation axis to the wheel mount; steering means connected to the wheel mount for rotating the wheel mount about the longitudinal axis; and wheel driving means connected between the wheel mount and the wheel for rotating the wheel about the rotation axis.

A further object of the present invention is to provide a device for directionally moving a trailer which is particularly suited to boat, camper and house trailers, and which is simple in design, rugged in construction and economical to manufacture.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
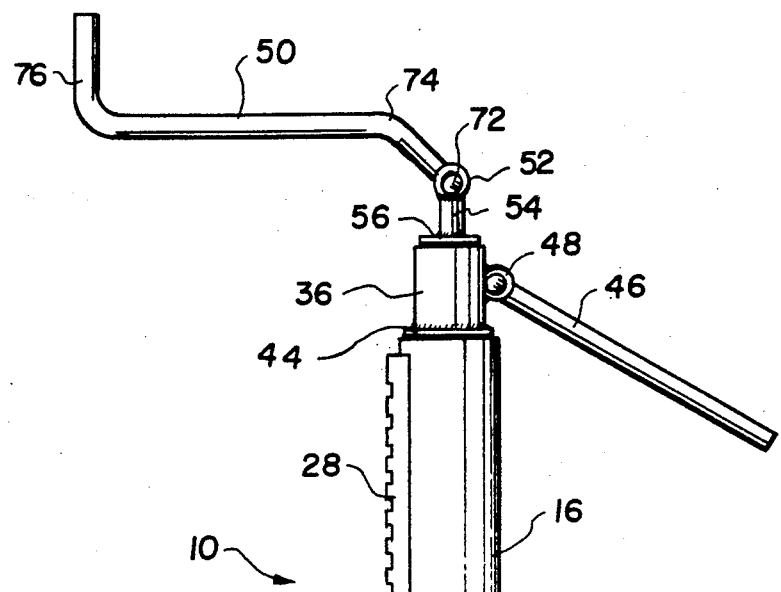
FIG. 1 is a front elevational view of the device according to the present invention, with portions cut away.
Figure 1:
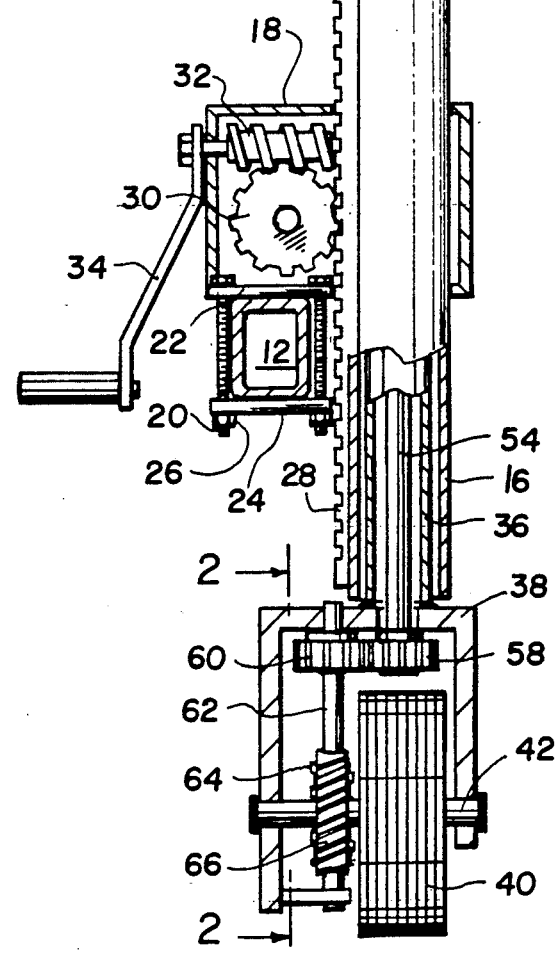

Referring to the drawings in particular, the invention embodied therein comprises a device generally designated 10 for directionally moving the tongue 12 of a trailer so as to maneuver a socket 14 connected to the trailer tongue, into correct position over the ball of a trailer hitch (not shown). The device of the invention may, alternatively, be connected to some other parts of a trailer or vehicle to be towed.

As best shown in FIG. 1, device 10 comprises a vertically elongated support member 16 having a longitudinal axis, which member is in the form of an outer hollow tube. The support member 16 is connected to the trailer by securing means. For example, member 16 is slidably received for vertical movement within a crank housing 18. Crank housing 18 is detachably connected to tongue 12 by a plurality of bolts 20 which extend through a flange 22 of housing 18, and through holes provided in a clamping plate 24. Nuts 26 are tightened on bolts 20 to clamp the trailer tongue 12 between flange 22 and plate 24.

In order to achieve relative vertical movement between outer tube 16 and crank housing 18 so as to raise and lower the trailer tongue 12, tube 16 is provided with a vertically extending rack 28 having teeth which mesh with the teeth of a pinion 30 mounted for rotation about a horizontal axis to crank housing 18. A worm gear 32 which is also mounted for rotation in crank housing 18, meshes with pinion 30 and is rotatable by a hand crank 34 which results in the raising or lowering of the tongue with respect to the tube 16 depending on the direction of rotation of the hand crank 34.

Other securing means may be provided for connecting the support member 16 to a trailer.

A wheel mount, in the form of an inner hollow shaft 36 having a bracket 38 connected to a lower end thereof, rotatably carries a wheel 40 for rotation about a horizontal axis on a axle 42 mounted to the U-shaped bracket 38. Shaft 36 is mounted for rotation about a vertical axis within tube 16 and is axially confined by the upper surface of bracket 38, at its lower end, and by a retaining washer 44 at its upper end. Washer 44 is fixed to the shaft 36 and extends over the top of tube 16.

Figure 3:
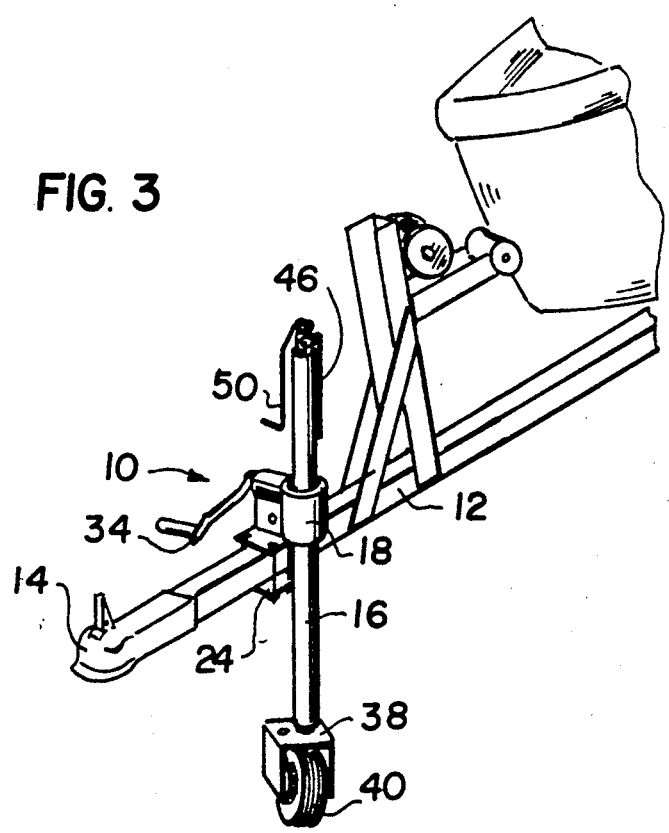
FIG. 3 is a perspective view showing the device of the invention connected to the tongue of a boat trailer.

Steering of wheel 40 about the vertical axis is achieved by a steering bar 46 which is pivotally connected at a hinge 48 to the upper end of shaft 36. Steering bar 46 is advantageously L-shaped, with the short leg of the L being mounted for rotation about a horizontal axis in hinge 48. This arrangement is provided so that, when not in use, the steering bar may be folded down to extend along the tube 16 as shown in FIG. 3.

Steering is achieved by manually lifting the steering bar so that it extends approximately horizontally, and thereafter rotating the steering bar in a horizontal plane to rotate the shaft 36.

Wheel 40 can be driven by rotating a hand crank 50 which is mounted at a hinge 52 to the upper end of an inner shaft 54. Hand crank 50 has an L-shaped end 72 with an intermediate bend 74 and an opposite L-shaped end 76 so that crank 50 can be pivoted in hinge 52 to bring it to a downwardly extending storage position shown in FIG. 3.

The upper end of the inner shaft 54 carries a second washer 56 which extends over the upper end of shaft 36. The lower end of inner shaft 54 extends through an opening in bracket 38 and carries a gear 58. Washer 56 and gear 58 maintain the axial position of shaft 54 within shaft 36 while at the same time permitting free rotation of the shaft 54.

Gear 58 meshes with a second gear 60 which is mounted for rotation about a vertical axis in bracket 38. A shaft 62 is fixed to gear 60 and carries a worm gear 64. Worm gear 64 meshes with a gear 66 which is fixed to the wheel 40 for rotation therewith.

Thus, by rotating hand crank 50, the gear train consisting of gears 58 and 60, shaft 62, and gears 64 and 66 causes the wheel 40 to rotate about its horizontal axis, thus driving the tongue 12.

The gear train and length of crank 50, allows the wheel 40 to be rotated with very little effort. While the wheel rotates slowly, only slow rotation is needed to align the trailer socket 14 with the ball of a trailer hitch.

Through the simultaneous use of the hand crank 50 and steering bar 46, the tongue can be effectively manipulated into position by a single operator. Following this manipulation, hand crank 34 is operated to lower the tongue to engage the socket to the hitch.

Figure 2:
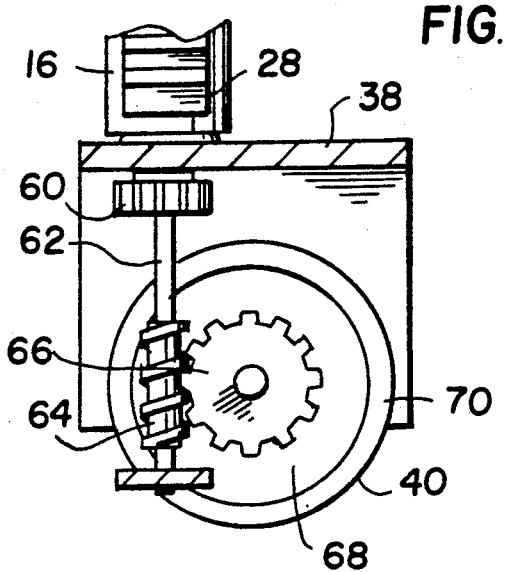
FIG. 2 is a side elevational view, partially in sections, taken along line 2—2 of FIG. 1.

As shown in FIG. 2, wheel 40 advantageously includes a metal rim 68 carrying a rubber tire 70.

The remaining parts of the invention are advantageously made of metal with washers 44 and 56 being welding to their respective shafts 36 and 54. Bracket 38 is likewise welded to shaft 36 with gear 58 and 60 being welded to respective shafts 54 and 62.

While a specific embodiment of the invention has been shown and described in detail to illustrate the application of the principles of the invention, it will be understood that the invention may be embodied otherwise without departing from such principles.

What is claimed is:

1. A device for directionally moving a trailer, the device comprising:

an elongated support member having a longitudinally axis;

securing means operatively connected to the support member and connectable to the trailer for securing the support member on the trailer;

a wheel mount;

a wheel mounted for rotation about a rotation axis to the wheel mount;

steering means connected to the wheel mount for rotating the wheel mount about the longitudinal axis; and wheel driving means connected between the wheel mount and the wheel for rotating the wheel about the rotation axis;

said wheel mount comprising a hollow shaft mounted for rotation about the longitudinal axis to the support member, and a bracket connected to a lower end of the hollow shaft, the wheel being mounted for rotation about the rotation axis to the bracket;

said support member comprising a hollow tube for rotatably receiving said hollow shaft therein, and retaining means connected to said hollow shaft for fixing the relative axial position between the hollow shaft and the hollow tube;

said steering means comprises a steering bar operatively connected to the hollow shaft for rotation of the hollow shaft about the longitudinal axis;

said driving means comprising an inner shaft mounted for rotation about said longitudinal axis in said hollow shaft, a gear train operatively connected between the inner shaft and the wheel for rotation of the wheel with rotation of the inner shaft about the longitudinal axis; and a crank handle connected to the inner shaft for rotation of the inner shaft with rotation of the crank handle.

2. A device according to claim 1 wherein said gear train comprises a first gear connected to the inner shaft, a second gear mounted for rotation to the bracket, a third gear fixed with respect to the second gear, and a fourth gear fixed to the wheel and meshed with the third gear.

3. A device according to claim 2 wherein the third gear comprises a worm gear.

4. A device according to claim 1 wherein the crank handle is pivotally mounted to the inner shaft and the steering bar is pivotally mounted to the hollow shaft for pivoting the steering bar and crank handle into storage positions extending along the tube.

5. A device according to claim 1 wherein said securing means comprises a crank housing for receiving the support member for movement parallel to the longitudinal axis, and vertical drive means operatively connected between the crank housing and the support member for vertically moving the support member with respect to the crank housing.

6. A device according to claim 5 wherein the vertical drive means comprising a rack extending along the tube, a pinion mounted for rotation to the crank housing and meshed with the rack, and a hand crank with worm gear mounting for rotation to the crank housing and meshed with the pinion for rotation of the pinion with rotation of the hand crank.

7. A device according to claim 6 wherein a portion of the hollow shaft extends above an upper end of the hollow tube, said steering bar being connected to said portion of the hollow shaft for rotation of the hollow shaft about the horizontal axis.

8. A device according to claim 7 wherein said crank handle is pivotally mounted to the inner shaft and the steering bar is pivotally mounted to the portion of the hollow shaft for pivoting of the crank handle and steering bar into a storage position extending along the hollow tube.

9. A device for directionally moving a trailer with tongue, comprising:

an outer hollow tube;

means for securing the outer hollow tube to the tongue of the trailer;

a rotatable hollow shaft positioned within the outer hollow tube;

a bracket rigidly attached to a bottom end of the hollow shaft;

a wheel rotatably mounted to the bracket;

a steering bar hinge-mounted to an upper portion of the hollow shaft for rotation of the bracket and the wheel, thereby determining the direction in which the trailer will move;

an inner shaft positioned within the hollow shaft, said inner shaft having a gear at its lower end and a hinge-mounted crank handle at its upper end; and means located in the bracket for translating the cranking rotation of the inner shaft into rotational movement of the wheel.

10. A device according to claim 9 wherein said means for securing the outer hollow tube to the tongue comprise vertical drive means for raising and lowering the hollow tube with respect to the tongue, said means located in the bracket comprising a second gear mounted for rotation to the bracket and carrying worm gear, and a pinion connected to the wheel and meshed with the worm gear.

11. A device according to claim 10 wherein the steering bar is L-shaped, and the crank handle has opposite L-shaped portions and an intermediate bend so that the steering bar and crank handle are pivotably downwardly in a storage position extending along the hollow tube.

* * * * *